Aug. 26, 1969     S. B. WELCH     3,463,905
COMBINATION INFINITE HEAT SWITCH AND
SOLID-STATE TEMPERATURE CONTROL
Filed June 30, 1966

INVENTOR.
STANLEY B. WELCH

BY Richard L. Caslin

HIS ATTORNEY

United States Patent Office 3,463,905
Patented Aug. 26, 1969

3,463,905
COMBINATION INFINITE HEAT SWITCH AND SOLID-STATE TEMPERATURE CONTROL
Stanley B. Welch, Louisville, Ky., assignor to General Electric Company, a corporation of New York
Filed June 30, 1966, Ser. No. 561,824
Int. Cl. H05b 1/02
U.S. Cl. 219—494
16 Claims

ABSTRACT OF THE DISCLOSURE

A solid-state temperature control circuit for controlling electrical heating devices. An infinite heat switch is connected serially with a silicon controlled rectifier (SCR) and a temperature responsive unijunction is connected with a divider circuit to generate control signals for firing the SCR on alternate half cycles when the temperature of an area to be heated is above a first level. Control signals are generated for firing the SCR on both half cycles when the temperature of the area to be heated exceeds a second higher level or final desired temperature. A timing device may be included to terminate the heating process after a predetermined period has elapsed.

---

The present invention relates to a control circuit or, more particularly, to a control circuit for regulating the temperature of a domestic cooking device whether it be a surface heating unit or a self-cleaning baking oven.

Many circuits and control devices have been designed for the express purpose of regulating the temperature of a domestic cooking device such as surface unit or oven. Most of these have the common characteristic that a maximum average voltage from a suitable power source is applied across an electric heating element until the temperature in the area near the element approaches or reaches a desired level, at which time a thermally responsive element such as a bimetallic strip acts to disconnect the power source from the heating element. When the area has cooled sufficiently, the thermally responsive device acts to reconnect the power source to the heating element so that maximum average voltage is applied across the element.

This invention is of particular utility when installed in a self-cleaning oven using a pyrolytic process for removing the food soil from the walls of the oven liner. Such an oven is taught in the patent of Bohdan Hurko No. 3,121,158 which is assigned to the General Electric Company, the assignee of the present invention.

It is one object of the present invention to provide a solid-state control circuit which allows the application of maximum power to a heating means only until a first temperature level is reached which may be the normal cooking zone. Then the circuit allows a lesser average amount of power to be delivered to the heating means so as to slowly increase the temperature in the area until a second cutoff or final desired temperature is reached which may be the heat cleaning temperature range. This results in a very slow rate of heating.

It is another object of the present invention to provide a control circuit of the class described in which power supplied to a heating means is automatically cut off when the temperature in the area approaches a predetermined level and cycles on and off until a timing device deenergizes the circuit so as to eliminate overshooting and uneven heating.

To achieve these and other objects, the present invention provides a solid-state control circuit for an electric heating element which is adapted for connection across an alternating voltage power source. A thermally activated switch which can prevent delivery of power to the heating element is controlled by a thermal means which is serially connected to a controllable switching device. Control signals for the switching device are generated in a temperature-responsive circuit which produces such signals on alternate half cycles only when the temperature is above a first level and on both half cycles only when the temperature exceeds a second higher level or final desired temperature.

The control circuit operates in such a way that a maximum average power is supplied to the electric heating element at temperatures below the first level, but a lesser average magnitude of power is supplied when the temperature is between the first level and the second level. This lesser average magnitude of power is sufficient to raise the temperature of the area being heated toward a desired value under all normal operating conditions.

While the specification concludes with claims particularly pointing out and distinctly claiming that which is regarded as the present invention, the organization, operation, and advnatages of several embodiments of the invention may be more readily ascertained from the following detailed description taken in conjunction with the accompanying drawing in which:

Figure 1:
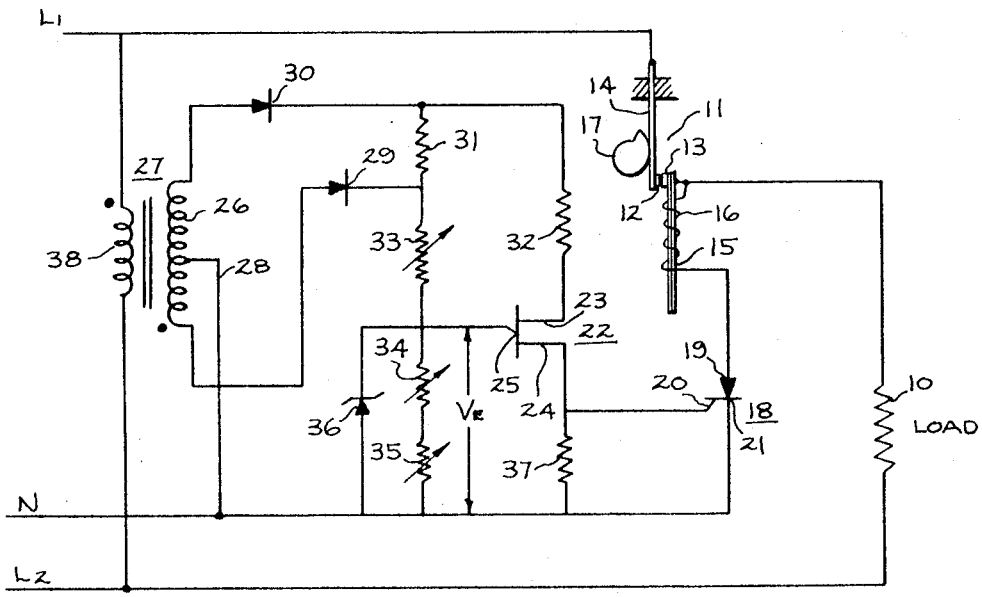
FIGURE 1 is a schematic diagram of a solid-state control circuit which constitutes one embodiment of the present invention.

Referring now to FIGURE 1 there is illustrated a solid-state control circuit which constitutes one embodiment of the present invention. The circuit includes a load 10, which may be one or more electric oven heating elements connected across a pair of power supply lines, or conductors, $L_1$ and $L_2$ through a snap-acting infinite heat switch 11. The infinite heat switch 11 includes a pair of normally closed relatively movable switch contacts 12 and 13 cantilevered at the ends of arms 14 and 15, respectively. The arm 15 is a thermally responsive member, such as the illustrated bimetallic element, which snaps open line $L_1$ when it is sufficiently heated by the passage of current through a heating resistor 16 that is associated with the bimetal such as being wound therearound. The important characteristic of the infinite heat switch 11 is that the magnitude of the average power which it allows to be delivered to the load 10 is related to the initial bias of contact 12 against contact 13. In switch 11, this initial bias may be decreased by rotating a cam member 17 in one direction to cause it to bear upon the arm 14 so as to urge it toward the arm 15. The natural resiliency of the arm 14 causes it to move away from the arm 15 when the cam member 17 is rotated in the opposite direction.

Electron flow through the heating resistor 16 is controlled in part by a switching deivce such as a silicon controlled rectifier (SCR) 18, which conducts only when the voltages at its anode 19 and its gate 20 are positive with respect to the voltage at its cathode 21.

Positive voltages at the gate 20 are generated in a temperature responsive firing circuit which includes, in part, a unijunction transistor 22 having an emitter terminal 25, a first base terminal 23 connected to the lower end of a resistor 32, and a second base terminal 24 connected through a resistor 37 to neutral connection N. The firing circuit receives its power through an included secondary winding 26 on a stepdown transformer 27 having its primary winding 38 connected across power lines $L_1$ and $L_2$. The secondary winding 26, which includes a center tap 28 leading to neutral connection N, is inverted with respect to the primary winding. That is, a current flowing from $L_1$ to $L_2$ or from top to bottom through the primary winding will induce a current in the secondary winding 26 flowing from the bottom of the secondary winding 26 through the circuit to the center tap 28. The lower end of the secondary winding 26 is connected to the anode of a diode 29 whereas the upper end of winding 26 is connected to the anode of a similar diode 30. The cathodes of diodes 29 and 30 are connected at the lower and upper ends, respectively, of a resistor 31. The resistor 31 is serially connected to the neutral connection N through three serially connected resistors: a calibrating resistor 33, a temperature setting resistor 34, and a temperture responsive resistor or sensor 35. The temperature-responsive resistor 35 has a positive temperature coefficient of resistance; i.e., the magnitude of its resistance is proportional to the temperature of the area in which the resistance is located, which will be assumed to be an oven for purposes of illustration only. A Zener diode 36, connected between the emitter terminal 25 of the unijunction transistor 22 and the neutral connection N, limits the maximum voltage which may be appled to the emitter terminal 25. It is used to stabilize the value of $V_E$ at which the unijunction 22 fires regardless of supply voltage regulation.

The transistor 22 passes from a nonconducting to a conducting condition when the voltage at its emitter terminal 25 becomes large enough to forward bias the junction between the emitter terminal 25 and the base terminal 24. The emitter voltage must exceed the reverse biasing voltage which is the sum of the voltage developed across the resistor 37 plus the voltage developed in the unijunction transistor 22 due to the passage of a small current from base terminal 23 to base terminal 24. The magnitude of the resistance to current flow between these two terminals, the interbase resistance, varies from several thousand ohms when the transistor 22 is in its nonconducting condition to a few ohms when it is in a conducting condition. When the drop in interbase resistance occurs, the current flowing through the unijuntcion transistor 22 and resistor 37 suddenly increases, thus increasing the voltage developed across the resistor 37. This increased voltage is sufficient to fire the SCR 18 provided that its anode 19 is already positive with respect to its cathode 21.

The operation of the above-described temperature responsive firing circuit is as follows:

At the beginning of a heating or cooking cycle, the oven will normally be at room temperature and the temperature responsive resistor 35 will be at its minimum value. The desired temperature level is set by adjusting the temperature setting resistor 34 through an appropriately calibrated knob. The infinite heat switch 11 will have been preset at the factory during manufacture thereby giving a single infinite heat setting. On the half cycles when $L_1$ is positive with respect to $L_2$, a current will be induced in the secondary winding 26 of the transformer 27 which will flow through the diode 29 to the junction between resistors 31 and 33. At that junction, the current splits and part of it flows through the series combination of resistors 33, 34 and 35 to the neutral connection N, while the remainder flows through the resistors 31 and 32, the unijunction transistor 22, and the resistor 37 to the neutral connection N. On this half cycle, the emitter voltage is a fraction of the secondary voltage, which fraction is the sum of the magnitudes of resistors 34 and 35 divided by the sum of the magnitudes of resistors 33, 34 and 35. On this same half cycle, the triggering voltage is also a fraction of the secondary voltage. This fraction is determined by the sum of the magnitude of resistor 37 plus the product of the intrinsic standoff ratio of the unijunction transistor 22 and the interbase resistance of the transistor 22 divided by the sum of the magnitudes of resistors 37, 32, 31 and the interbase resistance of the transistor 22.

On the half cycle where $L_1$ is negative with respect to $L_2$, the current flow will be through diode 30. On this half cycle, the emitter voltage $V_E$ is a fraction of the secondary voltage consisting of the magnitudes of resistors 34 and 35 divided by the sum of magnitudes of resistors 31, 33, 34 and 35. Since the fraction now includes the resistor 31 in its denominator, it will be seen that the emitter voltage will be lower on this half cycle than on the opposite half cycle for identical secondary voltages and sensor temperature. On this half cycle, the triggering voltage will be a fraction of the secondary voltage determined by a voltage divider which does not include the resistor 31 in its denominator. Therefore, the triggering voltage is larger on this half cycle than on the opposite half cycle, if the secondary voltages are identical. Because of this "shifting" of resistor 31 between the base and the emitter voltage dividers on alternate half cycles, the emiter voltage will exceed the triggering voltage on the positive half cycles of the supply voltage before it exceeds the triggering voltage on the negative half cycles.

In the initial phases of the heating operation, however, the sum of the magnitudes of temperatures sensitive resistor 35 and temperature setting resistor 34 will be low enough that the emitter voltage will not exceed the triggering voltage on either half cycle. Because of the high interbase resistance of the transistor 22 in its non-conducting condition, the current flow through resistor 37 will not be great enough to cause a firing voltage at the gate 20 of the SCR 18. The SCR 18 will not conduct on either cycle so that no current can flow through the heating resistor 16. The entire supply voltage will be impressed across the load 10 so that the maximum amount of heat will be generated by that load.

As the magnitude of the temperature sensing resistor 35 increases with the temperature, the voltage developed across the emitter terminal 25 of the transistor 22 becomes steadily larger. At a first temperature level which may be about 20 degrees below the desired average temperature level the magnitude of resistor 35 is large enough to cause the transistor 22 to conduct on the positive half cycles but not on the negative half cycles. When the transistor 22 fires, the voltage developed across resistor 37 increases suddenly and causes a positive firing voltage to appear at the gate 20 of the SCR 18. Since $L_1$ is positive during this half cycle, the anode 19 of the SCR is also positive. The SCR 18 will conduct and current will start to flow through the heating resistor 16.

On the negative half cycles the transistor 22 will not fire at these temperatures and the SCR 18 will not conduct.

The heating resistor 16 will be supplied with current on the positive half cycles of the supply voltage for several seconds before the bimetallic arm 15 of the switch 11 warps enough to the right to break the electrical connection between contacts 12 and 13. When the switch opens, the SCR 18 will no longer conduct on the positive half cycles of the supply voltage since its anode 19 will then be negative with respect to its cathode 21. On the negative half cycles of the supply voltage, the voltage developed across the emitter terminal 25 of the transistor 22 will not be great enough to cause the transistor 22 to conduct. The voltage developed across the resistor 37 will not be sufficiently positive to cause the SCR to conduct even though its anode is positive with respect to cathode on this half cycle. Therefore, no current will pass through the heating resistor 16 on either half cycle and the bimetallic arm 15 will begin to cool and will warp to the left until the contacts 12 and 13 are again touching. Therefore, by varying the bias of the contacts 12 and 13 and thus the length of time for which the switch will remain closed, the average magnitude of power developed by the load 10 may be varied so that the heat generated just balances or slightly exceeds the heat losses from the area.

If the heat generated exceeds the heat lost, the oven temperature and the magnitude of resistor 35 will continue to increase. When the temperature reaches a level which may be about 20 degrees above the first temperature level, the magnitude of resistor 35 will be high enough to cause transistor 22 to fire on both half cycles of the supply voltage. If the switch 11 is closed when this second temperature level is reached, the circuit will function in the same manner as it does when the unijunction transistor 22 is conducting only on the positive half cycles of the supply voltage. If the switch 11 is open, however, the SCR 18 will conduct on the negative half cycles of the supply voltage, thus allowing the current to pass through the heating resistor 16 during this half cycle. This current will cause enough heat to be generated by the resistor 16 to hold the switch 11 in its open position. Since the magnitude of resistor 16 is much greater than the magnitude of the load resistor 10 in practical situations, the current through the load will be greatly reduced. While this reduced current causes some heat to be generated by the load, the generated heat will not be enough to maintain the oven temperature. The oven temperature and the magnitude of the resistor 35 will decrease to a level at which the unijunction transistor fires only on the positive half cycles as was described before. The circuit repeat this sequence of operation until the cooking operation is automatically or manually terminated by cutting off the power supply for the control circuit by a switch not shown in FIGURE 1.

While the SCR 18 stops conducting on the negative half cycles of the supply voltage as soon as the temperature of the sensor 35 falls below the second temperature level, the switch 11 does not immediately reclose due to the thermal lag of heater 16 and bimetal 15. Upon sufficient cooling, contacts 12 and 13 reclose. The SCR 18 will now fire on positive half cycles of the supply voltage provided the temperture of the sensor resistor 35 is above the first temperature level. This being the case, heater 16 and bimetal 15 heat and reopen the contacts 12 and 13.

Figure 2:
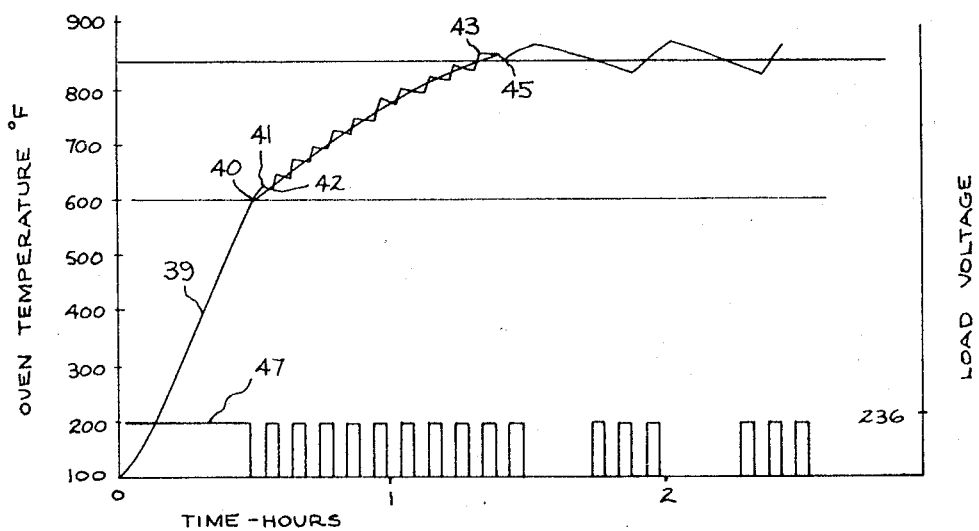
FIGURE 2 is a chart showing oven temperature versus time when using the circuit invention of FIGURE 1.

Referring now to FIGURE 2, line 39 is an illustration of temperatures of the oven in degrees Fahrenheit plotted against time in hours. Also plotted on the temperature-time graph of FIGURE 2 is a diagrammatic showing of the power curve 47 as a function of the load voltage versus time. On the chart, at temperatures below about 600° F., neither the SCR 18 or the transistor 22 is conducting on either half cycle of the supply voltage. The infinite heat switch 11 remains closed with the result being that maximum average power is applied to the load 10 to cause a steady increase in the temperature in the oven. At about 600° F., or at point 40 on line 39, the magnitude of the resistor 35 has increased sufficiently so that the transistor 22 fires and the SCR 18 begins to conduct on positive half cycles of the supply voltage. Although the resistor 16 begins to generate heat immediately, the switch 11 remains closed for several seconds or until a point 41 is reached at which time the bimetallic arm 15 snaps to the right to separate the contacts 12 and 13. Since the SCR 18 does not conduct on either half cycle at these temperatures, no current passes through the resistor 16 which would tend to hold the switch open. Once the arm 15 has cooled sufficiently, the switch closes at a point 42. The reheating of arm 15 begins immediately since the SCR 18 will be conducting on positive half cycles. Since the oven cools much more slowly than the arm 15 of the switch 11, the heat loss from the oven while the switch 11 is open is on the order of a few degrees. When the switch recloses, the heat generated by the load 10 makes up for this loss and raises the temperature of the oven several degrees before the switch 11 opens again.

This cycle repeats itself about every 30 seconds or so until the temperature of the oven reaches a second temperature level denoted by a point 43 on line 39. At this second level, the magnitude of the temperature responsive resistor 35 is high enough that the SCR 18 will receive positive pulses at its gate 20 on both half cycles of the supply voltage. The switch 11 will be heated on the positive half cycles as before, but once opened will remain open due to the current flowing from line L₂ through the load 10, the heating resistor 16, and the SCR 18 on the negative half cycles of the supply voltage. Since the amount of heat generated by the load 10 during this time is negligible, the temperature of the oven will fall steadily until the magnitude of the temperature responsive resistor 35 has decreased to the point where pulses are supplied at the SCR gate 20 only on the positive half cycles of the supply voltage. No current flows through resistor 16 under these conditions and the bimetallic arm 15 of the switch 11 will begin to cool. When the switch 11 does close, the magnitude of the temperature responsive resistor 35 will be well within the range in which the SCR 18 will conduct on positive half cycles only for several seconds before the switch 11 opens. Starting at a point 45, the oven begins to reheat with the SCR 18 conducting only on positive half cycles and continues to heat until it reaches the temperature level at which positive pulses are provided at the SCR gate 20 on both half cycles. In other words, the oven temperature will vary from a high denoted at point 44 to a low denoted by point 45 once the cycle described above has begun. In between those two temperature extremes, power will be delivered to the load at less than a maximum average rate. It is clear that the final desired temperature level in the oven will be an average of the temperatures which exist during the repeated cycling between the high and low points.

Having described above one embodiment of this invention as applied to an oven control for a high temperature self-cleaning oven, it will readily be apparent to those skilled in this art that the invention might also be utilized as an automatic surface unit control where the temperature setting resistor 34 would be coupled to the cam 17 of the infinite heat switch 11 and operated by the same knob (not shown). Thus, an operator may set not only the desired temperature level but also the average rate at which power will be delivered to the load when the temperature in the area being heated reaches the first temperature level. Combinations of temperatures and average load power would be provided for all surface unit operations. For a frying load for example the first temperature level would be at about 50° F. less than the final desired temperature, and the infinite heat switch set for approximately 1000 watts. This wattage would be more than enough to maintain any frying load. The final desired temperature might be 300° F., hence the load would heat to 250° F. at full power, and then shift to 1000 watts and then maintain the 300° F. temperature during steady state cooking. For boiling, the first temperature level might be 200° F. and the second or final temperature level would be 250° F. for all boil rates. Boil rates would be set by adjusting the infinite heat switch to provide positions between 200 and 1200 watts. Water would heat at full power to 200° F. and then the heating rate would shift to a preset lower value. Should the pan boil dry and exceed 250° F., power would be reduced to maintain this temperature.

While there has been described at present what is regarded as the preferred embodiments of the present invention, variations and modifications thereof may occur to those skilled in the art. Accordingly, it is intended that the appended claims shall cover all such variations and modifications as fall within the true spirit and scope of the invention.

What I claim as new and desire to secure by Letters Patent of the United States is:

1. A temperature control circuit including:
 (a) an electric heating element for connection across a source of alternating voltage;
 (b) a thermally activated switch in circuit with said heating element and having a pair of relatively movable contacts;
 (c) thermal means for providing the heat necessary to activate said switch;
 (d) controllable switching means in series with said thermal means;

(e) temperature responsive circuit means for supplying control signals for said switching means to allow said switch means to become conductive, said circuit means being operable to supply such control signals on alternate half cycles of the voltage source only when the temperatures caused by the operation of said heating element exceed a first predetermined level and on successive half cycles only when the temperatures exceed a second higher predetermined level.

2. A temperature control circuit as recited in claim 1 wherein a first terminal of said thermal means is connected to a junction between one of said relatively movable contacts and one terminal of said electric heating element.

3. A temperature control circuit as recited in claim 1 wherein said controllable switching means has a first electrode connected to a terminal of said thermal means, a second electrode adapted for connection to a neutral terminal and a control electrode connected to said temperature responsive circuit means.

4. A temperature control circuit as recited in claim 1 wherein said thermally activated switch is characterized by the fact that the average power which it transmits to the load is a function of the initial spacing between said relatively movable contacts and of the amount of heat generated by said thermal means.

5. A temperature control circuit as recited in claim 1 wherein said temperature responsive circuit means includes:
  (a) a switching device with first and second base terminals and an emitter terminal;
  (b) an emitter voltage divider including first and second serially arranged resistive portions connected to said emitter terminal at their common junction;
  (c) a base voltage divider including third and fourth serially arranged resistive portions connected to one another through said first and second base terminals;
  (d) a fifth resistive portion connected between said first and said third resistive portions;
  (e) a source of unipotential current pulses; and
  (f) means for introducing alternate pulses into the circuit at the junction between said first and said fifth resistive portions and for introducing the intervening alternate pulses into the circuit at the junction between said fifth and said third resistive portions.

6. A temperature control circuit as recited in claim 5 wherein said switching device is characterized by the fact that the resistance to current flow from said first to said second base terminal is relatively high when the voltage at the emitter terminal is below a predetermined value, but is relatively low when the voltage at the emitter terminal exceeds the predetermined value.

7. A temperature control circuit as recited in claim 6 wherein the relative magnitudes of said first and second resistive portions vary in accordance with the temperatures generated by said electric heating element.

8. A temperature control circuit as recited in claim 6 wherein said electrically controllable rectifying means has a first electrode connected to a terminal of said thermal means, a second electrode adapted for connection to a neutral terminal at the source of alternating voltage, and a control electrode connected to the junction between said second base terminal and said fourth resistive portion in said temperature responsive circuit means.

9. A temperature control circuit including:
  (a) an electric heating element for connection across a source of alternating voltage;
  (b) a thermally activated switch in circuit with said heating element and having a pair of relatively movable contacts;
  (c) a heating resistor for providing the heat necessary to activate said switch, said resistor being connected at its first end to the junction of one contact of said pair of relatively movable contacts and of said electric heating element;
  (d) a controlled semiconductor rectifier having a first electrode connected to the second end of said heating resistor, a second electrode adapted for connection to a neutral terminal and a control electrode; and
  (e) a temperature responsive circuit for supplying control signals for said controlled semiconductor rectifier, said circuit being operable to supply such control signals on alternate half cycles of the voltage source only when the temperatures caused by the operation of said heating element exceed a first predetermined level and on successive half cycles when the temperatures exceed a second higher predetermined level, said circuit including a semiconductor switching device having first and second base terminals and an emitter terminal, an emitter voltage divider having first and second serially arranged resistive portions, at least one of which is temperature-variable, connected to said emitter terminal at their common junction, a base voltage divider including third and fourth serially arranged resistive portions connected to one another through said first and second base terminals, said control electrode of said controlled semiconductor rectifier being connected to the junction of said second base terminal and said fourth resistive portion, a fifth resistive portion connected between said first and said third resistive portions, a source of unipotential current pulses, and means introducing alternate ones of the current pulses into the circuit at the junction between said first and said fifth resistive portions and for introducing the intervening ones of the current pulses into the circuit at the junction between said fifth and said third resistive portions.

10. For use with an electric heating element connected to a source of alternating voltage through a switch activated by a thermal element, a circuit for controlling the energization of said thermal element, said circuit including:
  (a) a controllable switching means serially connected to the thermal element; and
  (b) a temperature responsive circuit means connected to said controllable switching means for supplying necessary control signals to allow such switching means to became conductive, said circuit means being operable to supply such control signals on alternate half cycles of the alternating voltage only when the temperatures exceed a first predetermined level and on successive half cycles only when the temperatures exceed a second higher predetermined level.

11. A circuit as recited in claim 10 wherein said controllable switching means has a first electrode connected to a terminal of the thermal element, a second electrode connected to a neutral terminal, and a control electrode connected to said temperature responsive circuit means.

12. A circuit as recited in claim 10 wherein said temperature responsive circuit means includes:
  (a) a switching device with first and second base terminals and an emitter terminal;
  (b) an emitter voltage divider including first and second serially arranged resistive portions connected to said emitter terminal at their common junction;
  (c) a base voltage divider including third and fourth serially arranged resistive portions connected to one another through said first and second base terminals;
  (d) a fifth resistive portion connected between said first and said third resistive portions;
  (e) a source of unipotential current pulses;
  (f) means for introducing alternate pulses into the circuit at the junction between said first and said fifth resistive portions and for introducing the intervening alternate pulses into the circuit at the junction between said fifth and said third resistive portions.

13. A circuit as recited in claim 12 wherein said switching device is characterized by the fact that the resistance to current flow from said first to said second base terminal is relatively high when the voltage at the emitter terminal is below a predetermined value, but is relatively low when the voltage at the emitter terminal exceeds the predetermined value.

14. A circuit as recited in claim 13 wherein the relative magnitudes of said first and second resistive portions vary in accordance with the temperatures to which they are subjected.

15. A circuit as recited in claim 12 wherein said controllable switching means includes a first electrode adapted to be connected to a terminal of the thermal element, a second electrode adapted to be connected to a neutral terminal, and a control electrode connected to said temperature responsive circuit means at the junction between said second base terminal and said fourth resistive portion.

16. A power circuit including:
(a) a heating element;
(b) a pair of electrical conductors adapted to be connected to an alternating current source;
(c) a neutral terminal;
(d) a switch means having a first terminal connected to one of said pair of electrical conductors and a second terminal connected to said heating element, said heating element connected with the second of said pair of conductors, said second terminal also being adapted to be selectively connected to said neutral terminal; and
(e) circuit means for selectively controlling the connection between said second terminal and said neutral terminal, said circuit means including an electrically controllable rectifier.

References Cited

UNITED STATES PATENTS

| 3,109,910 | 11/1963 | Fogleman | 219—501 |
| 3,385,957 | 5/1968 | Munson et al. | 219—501 |
| 2,993,976 | 7/1961 | Moore | 219—511 |

BERNARD A. GILHEANY, Primary Examiner

F. E. BELL, Assistant Examiner